United States Patent [19]

Sigurdsson

[11] Patent Number: 5,226,848
[45] Date of Patent: Jul. 13, 1993

[54] MACHINE FOR CUTTING TONGUES, CHEEKS AND BELLY FLAPS FROM FISH HEADS

[76] Inventor: Arni M. Sigurdsson, Nordurvangur 24, 220 Hafnarfjordur, Iceland

[21] Appl. No.: 874,805

[22] Filed: Apr. 28, 1992

[51] Int. Cl.⁵ ............................................ A22C 25/14
[52] U.S. Cl. ................................. 452/165; 452/160; 452/108; 452/118; 452/170
[58] Field of Search ............... 452/165, 160, 108, 118, 452/161, 162, 170

[56] References Cited

U.S. PATENT DOCUMENTS

| | | | |
|---|---|---|---|
| 4,442,569 | 4/1984 | Brower et al. | 452/119 |
| 4,583,265 | 4/1986 | Kristinsson | 452/170 |
| 5,098,334 | 3/1992 | Molaug | 452/116 |
| 5,106,334 | 4/1992 | Kristinsson | 452/165 |

*Primary Examiner*—Willis Little
*Attorney, Agent, or Firm*—Richard C. Litman

[57] ABSTRACT

A method and apparatus for cutting tongues, cheeks and belly flaps from fish heads and for cutting apart jaws of fish heads. The fish head is mounted on a reinforced beam beneath a spiked chain which moves the head along the beam; first towards horizontal knives which cut the tongue from the head, and then to vertical knives which cut the cheeks and the belly flaps from the head. Over the tongue knives are jaw rods which hold the jaw up to the beam adjacent the tongue knives. Inside the beam is a stick which can be driven down from the beam to locate the tongue in a cutting position below the tongue knives. The head hits a sensor which activates a power source for the stick. The belly flaps are held up by belly flap rods, which lie beneath the collar bones and keep the belly flaps from the tongue knives. The cheeks and belly flaps are cut off with two vertical cheek knives. Behind the cheek knives, there is a vertical step on the belly flap rods which support the belly flaps while the knives cut the cheeks and belly flaps. The jaw is then cut apart with a jaw knife located on the beam. One of the jaws then falls down a sliding chute which moves the head up and off the beam and then falls into a vat for bones.

16 Claims, 3 Drawing Sheets

MACHINE FOR CUTTING TONGUES, CHEEKS AND BELLY FLAPS FROM FISH HEADS

FIELD OF THE INVENTION

This invention relates generally to machines for cutting tongues, cheeks and belly flaps off fish heads.

DESCRIPTION OF THE RELATED ART

Improved catching techniques and increased catch has led to diminished fish stocks and reduced catches which requires improved utilization of the catch. Icelandic inventors have since 1981 developed machines for processing of heads. In the year 1986 there appeared a machine compression reinforced beam in the mouth of the head beneath its gum with a transfer wheel above. This transfer device was named gum beam. In 1987 there was introduced a spiked chain above the gum beam, which lengthened the transfer track. Above the gum beam there were two knives which formed a 60 degree angle and cut the headbone from the head resulting in a product called "cheeks" or "faces" including the tongue, both cheeks, the jaw 6 and all adjacent bones. Thus it is known today to process large cod heads, heads of up to 5 kg, where a cut is made between collar bones (belly flaps separated).

Salmon has a small head, at most 1 kg, the tongue is small and cheeks are small, while the belly flaps of the front part are relatively large and a cut has not been made between the collar bones (belly flaps connected on the underside). In 1990 there were designed three machines for processing front parts of salmon, a machine for cutting and skinning fish from the nape, a machine for cleaning head bone, backbone, gills and organs from the front part, involving a U-shaped, reinforced beam, where gills and organs were moved into the U-shape and along the beam, and a machine for processing belly flaps from the front part with an intact collar bone (collar bone tie not cut), where the beam is U-shaped with a knife at the tip that cuts its way through the head beneath the tongue. There the gill flaps and cheeks are elevated with sloping planes and the belly flaps cut off with horizontal knives at the topmost edge of the beam.

Further it is known to manually cut tongues and cheeks from a head. This however is a time consuming job that does not pay and is not worth the effort.

SUMMARY OF THE INVENTION

An object of the invention is to provide a method and a machine for mechanically cutting tongue and cheeks especially from large cod heads and even belly flaps from front parts. Such machine has not existed.

The machine involves a transport track in which a gum beam 13 is located in the mouth of the head 1 under its gum 3. Above the head 1 is a transport mechanism 2 for instance spiked chain which moves the head a along the gum beam 13. This much of the mechanism is known.

The machine involves horizontal knives 18 for cutting the tongue 7 and vertical knives 33 for cutting the cheeks 8 and belly flaps 10. The jaw 6 of the head 1 is held up to the gum beam 13 with the jaw rod 19 and the tongue 7 is pushed down below the tongue knives 18 with a stick 15 which is moved down from the gum beam 13. The belly flaps 10 are held up and away from the tongue knives 18 with the belly flap rods 22. The step 32 on belly flap rods 22 supports the rear part of the belly flaps 10, while the collar bone 11 is cut. The jaw 6 is cut apart with jaw knife 34 and it falls off the end of the gum beam 13. The machine as a whole is shown in general in FIG. 8 as well as front part 1 on its way through the machine. The machine will now be described in greater detail with the following figures.

DESCRIPTION OF THE PREFERRED EMBODIMENT

Figure 1:
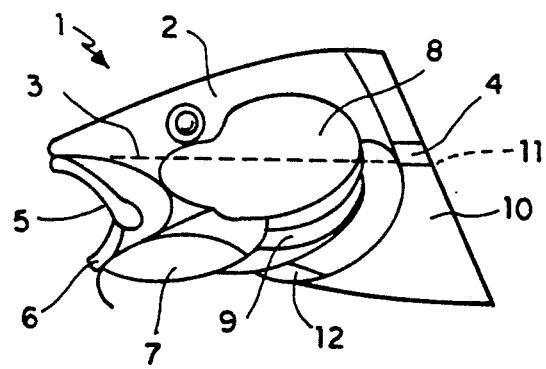
FIG. 1 is a side view of a Cod head.

The invention involves a method and machinery for cutting tongues, cheeks and belly flaps from a fish head or front part. The head 1 is put right up on a known reinforced beam 13 underneath a springy spiked chain 20 which moves the head 1 along the beam 13, first towards the horizontal knives 18 which cut the tongue 7 from the head 1 and then to vertical knives 33 which cut the cheeks 8 and the belly flaps 10 from the head 1. Over the tongue knives 18 are jaw rods 19 which hold the jaw 6 up to the beam 13 adjacent to the tongue knives 18. Inside the beam 13 is a stick 15, which can be driven down from the beam 13 and to the tongue 7 in cutting position and push tongue 7 down below the tongue knives 18. The head 1 hits a sensor 23, which activates the power source 14 of the stick 15. The belly flaps 10 of the front part 1 are held up by belly flap rods 22, which lie underneath the collar bones 11 and keep the belly flaps 10 from the tongue knives 18. Cheeks 8 and belly flaps 10 are cut off with two vertical cheek knives 33. Behind the cheek knives 33 on the belly flap rods 22 there is a vertical step 32 which supports the belly flap 10 while the knife 33 cuts. The jaw 6 is then cut apart with the jaw knife 34 which is foremost on the beam 13 and goes up into jaw 6 underneath. One of the jaws 6 then falls down a sliding chute 35 which moves the head 1 up and off the beam 13 and then falls into a vat for bones.

FIG. 1 shows cod head 1 with attached belly flaps 10, a so called front part including, headbone 2, gum 3, the end of backbone 4, mouth 5, jaw 6, tongue 7, cheek 8, gill flaps 9, belly flaps 10, collar bone 11 and collar bone tie 12.

Figure 2:
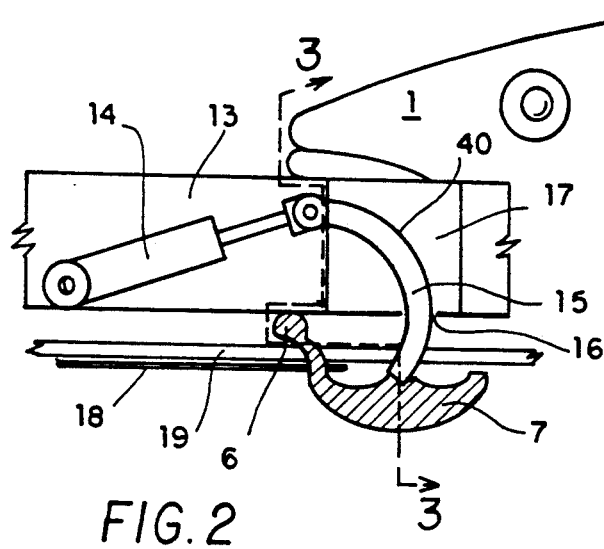
FIG. 2 is a side view of a Head or front part on beam.

FIG. 2 shows the head 1 from the side or the front part on the beam 13. Inside the beam there is a pneumatic piston 14 which drives the stick 15 down through the opening 16 to the tongue 7 and presses tongue 7 down below the tongue knives 18. The jaw 6 is held up to the beam 13 and away from the knife 18 with the jaw rods 19. The stick 15 glides in guides in symmetric Nylon chips 17. Basically this mechanism involves a stick 15 which is hidden inside the beam 13 or beside it and can be pressed or driven out of beam 13 to the tongue 7 to move tongue 7 below the tongue knives 18 when the tongue 7 is in cutting position.

Figure 3:
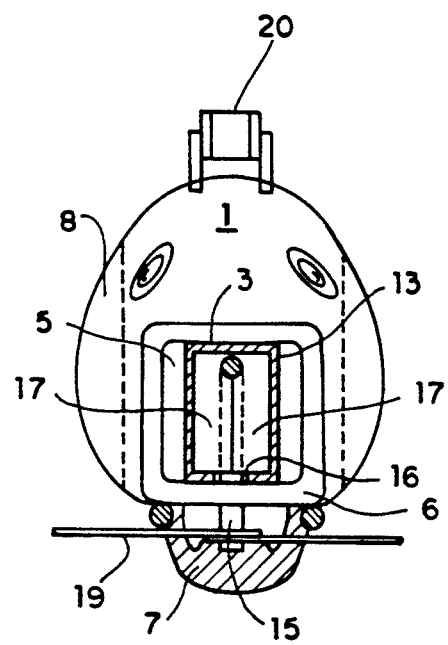
FIG. 3 is a Cross section A taken along line 3—3 in FIG. 2.

FIG. 3 shows a section along line 3—3 in FIG. 2 with the same symbols. The gum 3 of the head 1 rests on the beam 13 and is pressed down towards beam 13 and is moved along beam 13 by the spiked chain 20. 5 indicates mouth and 8 cheeks. The jaw rods 19 keep the jaw 6 up to the beam 13 and away from the tongue knives 18.

Figure 4:
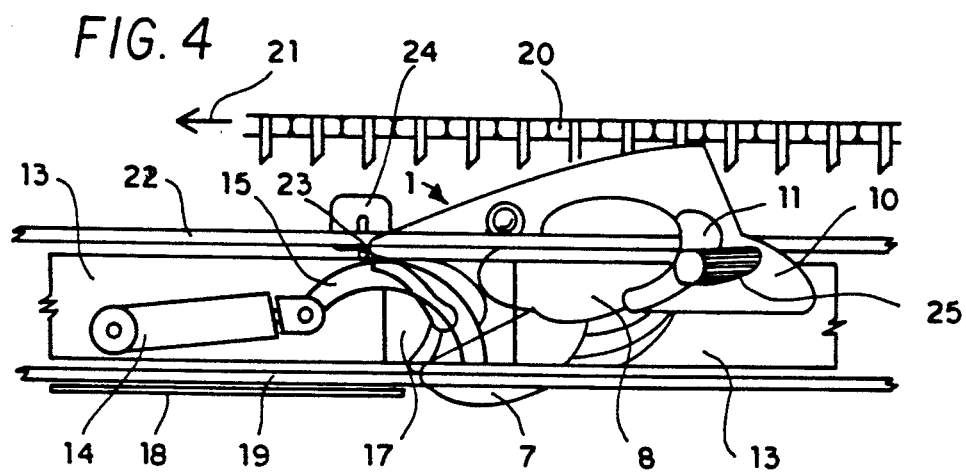
FIG. 4 shows a Front part on the gum beam from the side.

FIG. 4 shows the front part or head 1 on the beam 13 from the side. The spiked chain 20 drives the front part 1 or head in direction 21. The head 1 hits the sensor 23, which is connected to the activator 24, which activates the power source of the piston 14 which drives the stick 15 down to the tongue 7. The belly flap 10 with the collar bone 11 and the earbone 25 is held up from the knives 18 by the belly flap rods 22 so that the belly flaps 10 and the collar bones 11 do not hit the knives 18.

Figure 5:
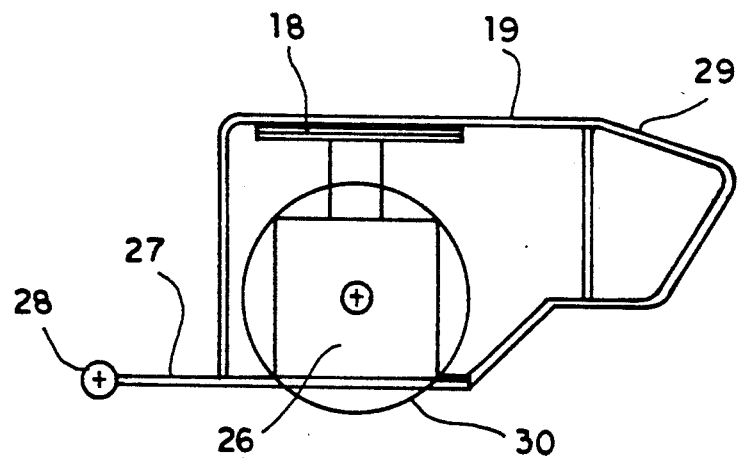
FIG. 5 shows the Tongue cutting knives from the side.

FIG. 5 shows from the side the tongue knives 18 driven by bevel gear drive 26 and sprocket 30. The bevel gear drive 26 and jaw rods 19 are fastened to a plate 27, which is fastened to and can rotate around the axle 28 for moving the knives 18 to and from the beam 13 depending on the size of the heads 1. The unit is connected to a spring 37 which holds its loose end up and presses the jaw rods 19 to the jaw 6. The front part of 29 of the rods 19 turn downwards and the the side (FIG. 6) for guiding the head 1 into the gap between the rods 19 and the middle of the head 1 under the spiked chain 20.

Figure 6:
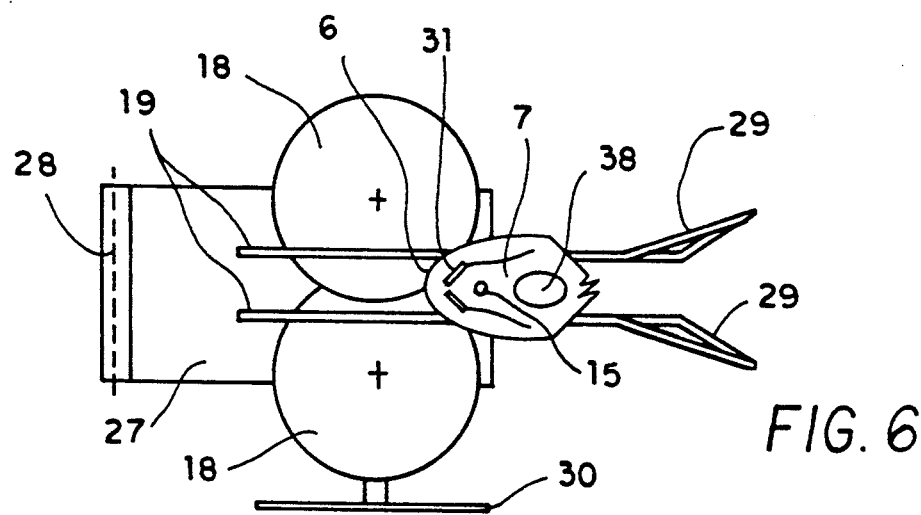
FIG. 6 shows the Tongue cutting unit in FIG. 5 from above.

FIG. 6 shows the tongue cutting unit in FIG. 5 seen from above and the tongue 7 in cutting position. Above the knives 18 are the jaw rods 19, and on them rests the jaw 6. The stick 15 drives the tongue 7 down between the jaw rods 19 and the knives 18 make the cuts 31 around the tongue. 38 is a portion of the tongue.

Figure 7:
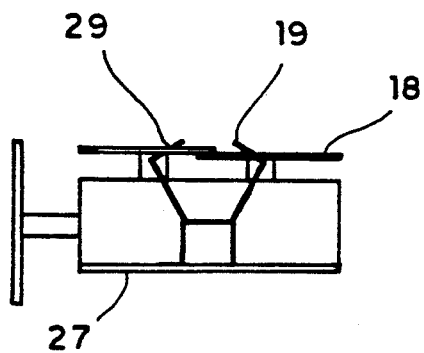
FIG. 7 shows the Tongue cutting unit in direction of motion.

FIG. 7 shows the tongue cutting unit in the direction of motion 21.

Figure 8:
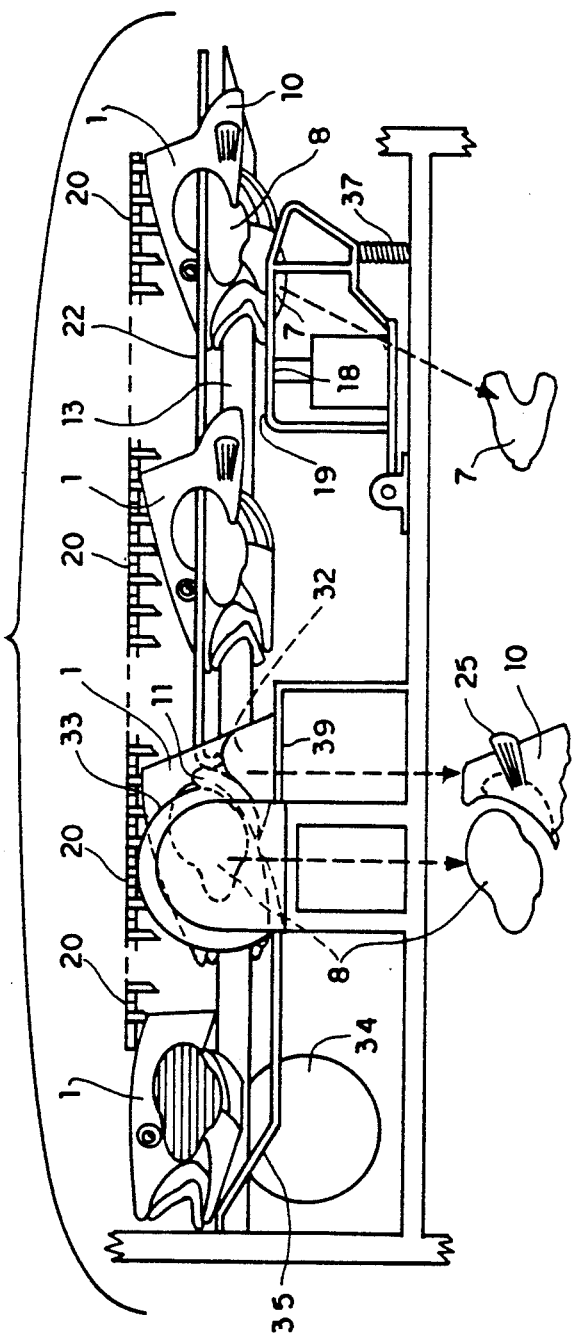
FIG. 8 shows the sequential stations for cutting off the tongue, belly flaps and cheeks and for cutting apart the jaw of a fish head.

FIG. 8 shows the front part or head 1 on its way through the machine along beam 13, where the belly flap rods 22 keep up the belly flaps 10.

The first station (right side) of FIG. 8 shows the front part or head 1 during the tongue cutting.

The next station of FIG. 8 shows the front part or head 1 after the tongue cutting.

The third station of FIG. 8 shows the front part or head 1 where the cheek 8 has been cut off with the cheek knife 33. The belly flap 10 and the collar bone 11 are held by a vertical step 32 on the belly flap rod 22, which prevents the collar bone 11 from falling back along with the belly flap 10 and thus avoids the knife 33. Beneath the head 1 adjacent to the cheek knives 33 there is a horizontal table 39 with a slit for the knives 33, sort of a plane 39, which restrains the lower side of the cheek 8 when it is cut, against the friction of the knives 33 with the cheek 8. The plane 39 is movable up and down to adjust for the size of heads 1 and cheeks 8. In the figure the plane 39 is shown beneath the cheek 8.

The leftmost station in FIG. 8 shows the front parts 1 or head after the jaw 6 has been cut apart when the jaw knife 34, and the head 1 has moved up along the slide 35, from where the head 1 moves off the end of the beam 13 and falls into a vat (not shown) for offal.

Figure 9:
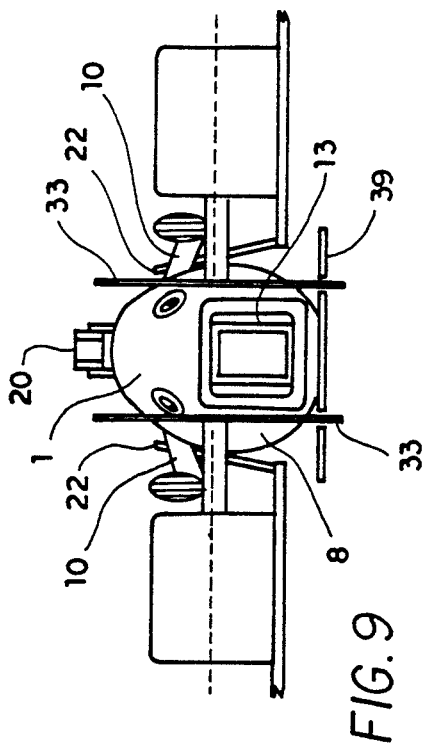
FIG. 9 is a front Cross section of the gum beam.

FIG. 9 shows a cross section of beam 13 in front of the cheek knives 33 in FIG. 8. The step 32 holds against pressure of the knives 33 when cutting the collar bones 11.

Figure 10:
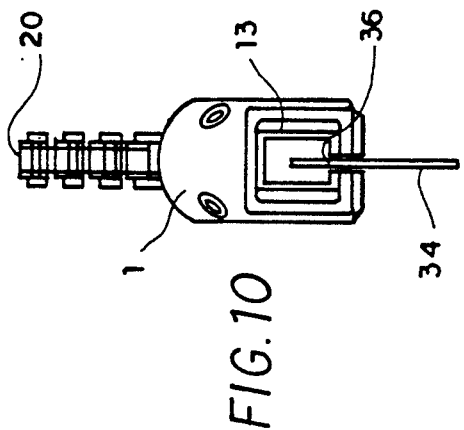
FIG. 10 is a front view of the Head during jaw cutting in FIG. 10.

FIG. 10 shows the head 1 during jaw cutting in FIG. 8. The jaw knife 34 cuts the jaw 6 apart and goes into the beam 13 through the opening 36 in the beam 13.

I claim:

1. A Fish head processing machine for removing portions from a fish head having a mouth, said portions including a tongue, cheeks, jaws, gill flaps and belly flaps, said fish head processing machine comprising:

a transport guide beam extending through said mouth of said fish head to guide said fish head during movement along said transport guide beam;

a transport mechanism in the form of a spiked chain which presses a headbone of said fish head against said transport guide beam and moves said fish head along said guide beam in a longitudinal direction of motion; and a plurality of cutting knives, each of which lies in a plane parallel to the direction of motion of said fish head to cut said portions from said fish head;

said plurality of cutting knives including at least one horizontal tongue cutting knife located beneath said transport guide beam to cut the tongue from the fish head.

2. A fish head processing machine as in claim 1, further comprising:

at least one jaw rod disposed parallel to said direction of motion beneath said jaw of the fish head to hold said jaw of said fish head up against the beam, and away from said at least one horizontal tongue cutting knife, by force of a spring.

3. A fish head processing machine as in claim 1, further comprising:

a stick disposed within said transport guide beam and engageable with said tongue through an opening in said beam; and a driving means disposed internally of said beam and connected to said stick to drive said stick downwardly to press said tongue below the cutting plane of said at least one tongue cutting knife; whereby said tongue is cut by said at least one tongue cutting knife.

4. A fish head processing machine as in claim 3, wherein:

said stick has the configuration of a circular arc guided in a circular arc channel formed in symmetrical cooperating guide chips located within said guide beam; and said driving means comprising a pneumatic piston pivotally connected to said stick.

5. A fish head processing machine as in claim 4, further comprising:

a sensor located on said guide beam for sensing when said tongue is in cutting position, and a starter which cooperates with said sensor to activate said driving means.

6. A fish head processing machine as in claim 1, further comprising:

a pair of belly flap rods disposed in the direction of motion of said fish head beneath said belly flaps and beneath collar bones on a front part of said fish head to keep said belly flaps and collar bones up and away from said at least one horizontal tongue cutting knife.

7. A fish head processing machine as in claim 1, further comprising:

at least two horizontal tongue cutting knives driven by a bevel gear drive;

said bevel gear drive and said at least two horizontal tongue cutting knives being mounted on a horizontal base plate pivotally mounted below said transport guide beam on a horizontal axle;

at least two jaw rods mounted on said horizontal base plate in said direction of motion of said fish head beneath said jaw of said fish head to hold said jaw up to said transport guide beam and away from said at least two horizontal tongue cutting knives; and a spring biasing said horizontal plate towards said transport guide beam; whereby said at least two horizontal tongue cutting knives and said at least two jaw rods form a fixed tongue cutting unit which is spring biased to swing around said axle.

8. A fish head processing machine as in claim 7, said at least two jaw rods each include a slide portion for guiding the tongue between said at least two jaw rods and a central portion of the tongue beneath a stick disposed within said transport guide beam operable to depress said tongue to engage and be cut by said at least two horizontal tongue cutting knives.

9. A fish head processing machine as in claim 6, said plurality of cutting knives further including two vertical cheek knives disposed one on each side of said transport guide beam for cutting the cheeks of the fish head from the fish head.

10. A fish head processing machine as in claim 9, further comprising:

a step on each of said belly flap rods disposed adjacent the rearmost part of the belly flaps and collar bones when said vertical cheek knives are at the front limit of said collar bones; whereby said steps restrain said belly flaps from falling back on said transport guide beam enabling said cheek knives to cut off said belly flaps with said cheeks from said fish head.

11. A fish head processing machine as in claim 1, said plurality of cutting knives further including at least one vertical jaw knife disposed beneath said transport guide beam and extending into a slot on the bottom of said transport guide beam, whereby said jaw is split apart enabling said fish head to move to the end of said transport guide beam.

12. A method for removing a tongue, cheeks and belly flaps from a fish head and for cutting a jaw of said fish head comprising the steps of:

mounting a fish head on a transport guiding beam by inserting said transport guiding beam through a mouth of said fish head;

moving said fish head along said transport guiding beam in a direction to further insert said transport guiding beam through said mouth of said fish head;

providing a plurality of cutting knives each disposed in a plane parallel to said transport guide beam;

holding the belly flaps and collar bones up towards said transport guide beam with a resilient force;

pressing said tongue down below said transport guide beam; and making a horizontal cut with at least one of said cutting knives while said fish head is moved along said transport guide beam; whereby said tongue is cut from the fish head and falls into a vat for tongues.

13. A method as set forth in claim 12, further comprising the further step of cutting off said cheeks from said fish head as said fish head is moved along said transport guide beam by at least two of said plurality of cutting knives, whereby said cheeks fall into a vat for cheeks.

14. A method as in claim 13, further including the step of cutting off said belly flaps from said fish head as said fish head is moved along said transport guide beam by at least two of said plurality of cutting knives, whereby said belly flaps fall into a vat for belly flaps.

15. A method as in claim 14 whereby said cheeks and said belly flaps are cut off by the same cutting knives and fall into the same vat.

16. A method as in claim 15, further including the step of cutting said jaw by at least one of said plurality of cutting knives to enable said fish head to move off an end of said transport guide beam in said direction of movement, whereby said fish head falls into a vat for offal.

* * * * *